United States Patent
Miyajima et al.

(10) Patent No.: US 11,248,135 B2
(45) Date of Patent: Feb. 15, 2022

(54) INK JET INK COMPOSITION FOR TEXTILE PRINTING, INK SET, AND RECORDING METHOD

(71) Applicant: Seiko Epson Corporation, Tokyo (JP)

(72) Inventors: Yoshitaka Miyajima, Matsumoto (JP); Yuki Wakushima, Matsumoto (JP); Hideki Oguchi, Shiojiri (JP); Takuya Sonoyama, Fujimi (JP)

(73) Assignee: Seiko Epson Corporation

( * ) Notice: Subject to any disclaimer, the term of this patent is extended or adjusted under 35 U.S.C. 154(b) by 900 days.

(21) Appl. No.: 15/850,722

(22) Filed: Dec. 21, 2017

(65) Prior Publication Data

US 2018/0179407 A1    Jun. 28, 2018

(30) Foreign Application Priority Data

Dec. 28, 2016 (JP) .............................. JP2016-255836
Jul. 31, 2017 (JP) .............................. JP2017-147982
Nov. 28, 2017 (JP) .............................. JP2017-228000

(51) Int. Cl.
| | |
|---|---|
| *C09D 11/00* | (2014.01) |
| *C09D 1/00* | (2006.01) |
| *C09D 4/00* | (2006.01) |
| *C09D 5/00* | (2006.01) |
| *C09D 13/00* | (2006.01) |
| *C09K 3/00* | (2006.01) |

(Continued)

(52) U.S. Cl.
CPC ............ *C09D 11/328* (2013.01); *C09D 11/38* (2013.01); *C09D 11/40* (2013.01); *D06P 1/14* (2013.01); *D06P 1/382* (2013.01); *D06P 1/39* (2013.01); *D06P 1/6491* (2013.01); *D06P 1/6495* (2013.01); *D06P 1/65118* (2013.01); *D06P 1/6735* (2013.01); *D06P 1/67316* (2013.01); *D06P 5/30* (2013.01)

(58) Field of Classification Search
USPC .................... 106/31.01, 31.13, 31.27, 31.43
See application file for complete search history.

(56) References Cited

U.S. PATENT DOCUMENTS

| | | | |
|---|---|---|---|
| 5,250,121 A | 10/1993 | Yamamoto et al. | |
| 5,674,314 A | 10/1997 | Auslander et al. | |

(Continued)

FOREIGN PATENT DOCUMENTS

| | | | |
|---|---|---|---|
| CN | 102504648 A | | 6/2012 |
| CN | 107163685 A | * | 9/2017 |

(Continued)

OTHER PUBLICATIONS

Database WPI, Week 201651, Thomson Scientific, London, GB, AN 2016-459671, (2 pages).

(Continued)

*Primary Examiner* — James E McDonough
(74) *Attorney, Agent, or Firm* — Harness, Dickey & Pierce, P.L.C.

(57) ABSTRACT

An ink jet ink composition for textile printing including a dye containing copper or chromium and 5% to 30% by mass of a cyclic amide that is liquid at normal temperature and that has a normal boiling point in the range of 190° C. to 260° C., wherein the hue angle ∠h° defined by the CIELAB color space on a recording medium ranges from 260 to 310 degrees.

20 Claims, 1 Drawing Sheet

(51) Int. Cl.
| | |
|---|---|
| *C09D 11/328* | (2014.01) |
| *D06P 5/30* | (2006.01) |
| *C09D 11/40* | (2014.01) |
| *C09D 11/38* | (2014.01) |
| *D06P 1/382* | (2006.01) |
| *D06P 1/673* | (2006.01) |
| *D06P 1/651* | (2006.01) |
| *D06P 1/649* | (2006.01) |
| *D06P 1/39* | (2006.01) |
| *D06P 1/14* | (2006.01) |

(56) References Cited

U.S. PATENT DOCUMENTS

| | | | |
|---|---|---|---|
| 5,897,694 A * | 4/1999 | Woolf | C09D 11/38 106/31.27 |
| 6,007,611 A | 12/1999 | Mheidle et al. | |
| 6,153,263 A | 11/2000 | Haruta et al. | |
| 6,293,667 B1 | 9/2001 | Gregory et al. | |
| 6,723,137 B1 | 4/2004 | Hakamada et al. | |
| 8,349,029 B2 | 1/2013 | Worner et al. | |
| 2003/0172840 A1 | 9/2003 | Blank et al. | |
| 2004/0003755 A1 | 1/2004 | Fukumoto et al. | |
| 2005/0036018 A1 | 2/2005 | Yanagihara et al. | |
| 2005/0172856 A1 | 8/2005 | Hasemann | |
| 2007/0101900 A1 | 5/2007 | Wheeler et al. | |
| 2007/0266887 A1 | 11/2007 | Koganehira et al. | |
| 2008/0032098 A1 | 2/2008 | Hornby et al. | |
| 2012/0216356 A1 | 8/2012 | Worner et al. | |
| 2013/0328979 A1 | 12/2013 | Shimizu et al. | |
| 2014/0157530 A1 | 6/2014 | Murai | |
| 2014/0375733 A1 | 12/2014 | Murai et al. | |
| 2015/0166807 A1 | 6/2015 | Komatsu | |
| 2015/0252200 A1 | 9/2015 | Kagata et al. | |
| 2016/0272834 A1 | 9/2016 | Kobayashi et al. | |
| 2016/0326384 A1 | 11/2016 | Chen et al. | |
| 2017/0009092 A1 | 1/2017 | Gotou et al. | |
| 2017/0275485 A1 * | 9/2017 | Oki | D06P 1/06 |
| 2018/0030292 A1 | 2/2018 | Gotou et al. | |
| 2018/0086929 A1 | 3/2018 | Hayashi et al. | |
| 2018/0179406 A1 | 6/2018 | Miyajima et al. | |
| 2018/0179407 A1 * | 6/2018 | Miyajima | C09D 11/38 |
| 2018/0215939 A1 | 8/2018 | Mizuno | |
| 2018/0244934 A1 | 8/2018 | Murai et al. | |
| 2019/0031899 A1 | 1/2019 | Oki et al. | |
| 2019/0093283 A1 | 3/2019 | Miyajima et al. | |
| 2019/0100669 A1 | 4/2019 | Murai et al. | |
| 2019/0105919 A1 | 4/2019 | Katsuragi | |
| 2019/0249025 A1 | 8/2019 | Miyajima et al. | |
| 2019/0284426 A1 | 9/2019 | Matsuzaki et al. | |
| 2019/0292393 A1 | 9/2019 | Murai | |
| 2020/0095443 A1 | 3/2020 | Kozaka et al. | |
| 2020/0095444 A1 | 3/2020 | Hagiwara et al. | |
| 2020/0131390 A1 | 4/2020 | Sakuma et al. | |

FOREIGN PATENT DOCUMENTS

| | | |
|---|---|---|
| DE | 10135042 A1 | 2/2003 |
| EP | 1357158 A1 | 10/2003 |
| EP | 2311917 A1 | 4/2011 |
| EP | 2412761 A1 | 2/2012 |
| EP | 3091056 A1 | 11/2016 |
| EP | 3299426 A1 | 3/2018 |
| JP | 61-002772 A | 1/1986 |
| JP | H08-259867 A | 10/1996 |
| JP | H11-012957 A | 1/1999 |
| JP | 2002-241639 A | 8/2002 |
| JP | 2004-359928 A | 12/2004 |
| JP | 2004-536180 A | 12/2004 |
| JP | 2009-227895 A | 10/2009 |
| JP | 2012-511591 A | 5/2012 |
| JP | 2014-062142 A | 4/2014 |
| JP | 2015-183311 A | 10/2015 |
| JP | 2016-044258 A | 4/2016 |
| JP | 2016-044259 A | 4/2016 |
| JP | 2016-135822 A | 7/2016 |
| JP | 2017-115094 A | 6/2017 |
| JP | 2017-214457 A | 12/2017 |
| JP | 2017-214668 A | 12/2017 |
| JP | 2018-109140 A | 7/2018 |
| WO | WO-2010-013649 A1 | 2/2010 |

OTHER PUBLICATIONS

Database WPI, Week 201575, Thomson Scientific, London, GB, AN 2015-63684Y, (2 pages).
Database WPI, Week 198608, Thomson Scientific, London, GB, AN 1986-050894, (2 pages).
Database WPI, Week 201263, Thomson Scientific, London, GB, AN 2012-J53239 (3 pages).
Extended European Search Report for Patent Application No. EP 17208435.2 dated May 3, 2018 (10 pages).
Extended European Search Report for Patent Application No. EP18197517.8 dated Feb. 11, 2019 (11 pages).
Extended European Search Report for Application No. EP 17 20 8431 dated May 3, 2018 (8 pages).
Database WPI, Week 201651, Thomson Scientific, London, GB, AN 2016-459671, XP002780277 (2 pages).
Aptoula et al., "Morphological Description of Color Images for Content-Based Image Retrieval", IEEE Transactions on Image Processing 18(11), Dec. 2009, pp. 2505-2517, 13 pages.
Hansen Solubility Parameters Table from Diversified Enterprises, URL: https://www.accudynetest.com/solubility_table.html, 5 pages.
Caprolactam datasheet, https: / /www.chemenu.com /products /CM200169, no date available; 2 pages.

* cited by examiner

INK JET INK COMPOSITION FOR TEXTILE PRINTING, INK SET, AND RECORDING METHOD

BACKGROUND

1. Technical Field

The present invention relates to an ink jet ink composition for textile printing, an ink set, and a recording method.

2. Related Art

An ink jet recording method includes ejecting ink droplets from a fine nozzle to deposit the ink droplets on a recording medium. This method can record high-resolution and high-quality images at high speed with a relatively inexpensive apparatus. The ink jet recording method requires numerous considerations, such as the properties of inks to be used, recording stability, and image quality. Thus, not only ink jet recording apparatuses but also ink compositions to be used are extensively studied.

The ink jet recording method is also used for dyeing (textile printing) of textiles. Textiles (woven fabrics and nonwoven fabrics) have been printed by a screen textile printing method or a roller textile printing method. Due to the advantages of high-mix low-volume production and immediate printing, however, the ink jet recording method is studied.

Ink compositions for use in textile printing ink jet recording also require various performance characteristics. For dyeing of textiles, there is some demand for performance characteristics that are different from those of general ink compositions. Thus, ink jet ink compositions for textile printing also require many considerations.

For example, reactive groups that react in textile printing may deteriorate during storage. JP-A-2002-241639 discloses a liquid composition containing a monochlorotriazine reactive dye and tris(hydroxymethyl)aminomethane in order to achieve high temporal stability (storage stability) without significant decomposition of reactive groups that react in textile printing.

An ink set composed of four dye inks of yellow, magenta, cyan, and black (YMCK) is also often used in ink jet textile printing. However, the use of such an ink set in the ink jet textile printing method sometimes cannot accurately reproduce the hue range of the screen textile printing method. For example, a reactive dye ink set for ink jet textile printing is proposed in International Publication WO 2010/013649 in order to expand the color reproduction range, particularly the color reproduction range in the hue range of magenta-violet-blue-cyan. The reactive dye ink set includes a cyan ink composition containing C.I. Reactive Blue 15:1 and a magenta ink composition containing C.I. Reactive Red 245.

As seen in these patent literatures, ink jet textile printing requires higher storage stability of inks and a broader color reproduction range of printed textiles. Like inks for use in general ink jet recording, improved color developability of inks and printed textiles (also referred to as recorded matter or printed matter) and higher image robustness (light fastness, etc.) of printed textiles are also required.

The present inventors have extensively studied the color developability and hue changes in ink jet textile printing in long-term outdoor exposure tests of printed textiles and have found that a particular hue created by color mixing (hereinafter also referred to as composite) of different color inks, such as CMYK, is likely to change over time. In particular, long-term outdoor exposure tests of printed textiles show that the hues of blue colors (colors with a hue angle $\angle h°$ in the range of 220 to 310 degrees, particularly with a hue angle $\angle h°$ in the range of 260 to 310 degrees), such as dark blue, navy blue (a common color name according to Japanese Industrial Standards (JIS)), deep blue, Prussian blue, blue, indigo blue, ultramarine blue, and lapis lazuli blue, are likely to change. The present inventors assume that such a hue change results partly from a difference in light fastness between dyes in inks.

SUMMARY

An advantage of some aspects of the invention is to provide an ink jet ink composition for textile printing that can produce a color with a hue angle $\angle h°$ in the range of 260 to 310 degrees with high color developability in printed textiles without color mixing of different colors, that can reduce the temporal hue change (higher light fastness), and that has high ejection reliability (recoverability from long-term clogging or continuous ejection stability). Another advantage of some aspects of the invention is to provide an ink set and a recording method.

The invention has been achieved to solve at least part of the problems described above and can be implemented in accordance with the following aspects or application examples.

An ink jet ink composition for textile printing according to an aspect of the invention contains a dye containing copper or chromium, and 5% to 30% by mass of a cyclic amide that is liquid at normal temperature and has a normal boiling point in the range of 190° C. to 260° C., wherein the hue angle $\angle h°$ defined by the CIELAB color space on a recording medium ranges from 260 to 310 degrees.

Such an ink jet ink composition for textile printing can produce a color with a hue angle $\angle h°$ in the range of 260 to 310 degrees with high color developability in printed textiles without color mixing of different colors, and can reduce the temporal hue change (higher light fastness). In other words, high color developability in printed textiles can be achieved by the ink jet ink composition including a dye containing copper or chromium and 5% to 30% by mass of a cyclic amide with a normal boiling point in the range of 190° C. to 260° C., the cyclic amide enabling a sufficient amount of the dye to be dissolved in the ink jet ink composition. Furthermore, a color with a hue angle $\angle h°$ in the range of 260 to 310 degrees can be produced without color mixing of different colors, and the temporal hue change can be reduced (higher light fastness).

It is preferable that the dye have a maximum absorption wavelength in the range of 550 to 600 nm.

Such an ink jet ink composition for textile printing can produce a color with a hue angle $\angle h°$ in the range of 260 to 310 degrees without color mixing of different colors.

It is preferable that the dye be at least one of C.I. Reactive Blue 13 and C.I. Acid Blue 193.

Such an ink jet ink composition for textile printing has still higher color developability.

It is preferable that the dye content range from 3% to 15% by mass.

Such an ink jet ink composition for textile printing has a sufficient dye content and has still higher color developability.

The ink jet ink composition for textile printing may have a pH in the range of 6 to 10.

Such an ink jet ink composition for textile printing has still higher color developability.

The ink jet ink composition for textile printing may contain no benzotriazole.

Such an ink jet ink composition for textile printing can reduce the production of foreign matter even when copper is eliminated from a dye containing copper.

In this case, the ink jet ink composition for textile printing may contain an alkyl polyol with a normal boiling point in the range of 180° C. to 260° C., and the alkyl polyol content may range from 10% to 25% by mass.

In such an ink jet ink composition for textile printing, even when a dye containing copper is likely to produce foreign matter by drying, the alkyl polyol can increase moisture retention and thereby maintain high recoverability from long-term clogging and high continuous ejection stability.

An ink set according to an aspect of the invention contains the ink jet ink composition for textile printing.

Such an ink set can produce a color with a hue angle ∠h° in the range of 260 to 310 degrees without color mixing of different colors, and can reduce the temporal hue change (higher light fastness) at least in a printed portion of the color in the hue angle range.

A recording method according to an aspect of the invention includes a pretreatment process of applying a pretreatment composition containing at least one of an alkaline agent, an acid, and a hydrotropic agent to a textile, and a printing process of applying the ink jet ink composition for textile printing to the textile.

Such a recording method can produce a color with a hue angle ∠h° in the range of 260 to 310 degrees with high color developability in printed textiles without color mixing of different colors, and can reduce the temporal hue change (higher light fastness).

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below. These embodiments are offered by way of illustration only. The invention is not limited to these embodiments and includes various modified embodiments without departing from the gist of the invention. Furthermore, all the elements described below are not necessarily essential for the invention.

1. Ink Jet Ink Composition for Textile Printing

An ink jet ink composition for textile printing according to the present embodiment (hereinafter also referred to as an ink jet ink composition for textile printing or an ink composition) is used by applying a pretreatment composition according to the present embodiment described later to a textile and subsequently applying the ink jet ink composition for textile printing to the textile by an ink jet method. The ink jet ink composition for textile printing will be described below.

The ink jet ink composition for textile printing according to the present embodiment includes a dye containing copper or chromium, and 5% to 30% by mass of a cyclic amide that is liquid at normal temperature and has a normal boiling point in the range of 190° C. to 260° C. The hue angle ∠h° defined by the CIELAB color space on a recording medium ranges from 260 to 310 degrees, particularly on a white recording medium. An appropriate measurement method is described below.

1.1. Dye

The ink jet ink composition for textile printing according to the present embodiment includes a dye containing copper or chromium.

1.1.1. Type of Dye

The dye in the ink jet ink composition for textile printing according to the present embodiment contains copper (Cu) or chromium (Cr) in its structure. The dye containing copper or chromium contains at least one copper or chromium atom in the structure of the dye molecule and may be a compound containing a structure, such as a copper complex, a copper complex salt, a chromium complex, or a chromium complex salt, in its molecule. Such a dye may be, but is not limited to, a dye with a phthalocyanine ring skeleton or a dye with a functional group that can coordinate to a copper or chromium atom.

Specific examples of a dye containing copper with which the hue angle ∠h° defined by the CIELAB color space on a recording medium can easily range from 220 to 310 degrees in the ink jet ink composition for textile printing include C.I. Reactive Blue 13, C.I. Reactive Blue 15, C.I. Reactive Blue 72, and C.I. Direct Blue 87. In particular, C.I. Reactive Blue 13 is a dye with which the hue angle ∠h° defined by the CIELAB color space on a recording medium can easily range from 260 to 310 degrees in the ink jet ink composition for textile printing.

The chemical structures of C.I. Reactive Blue 13, C.I. Reactive Blue 15, C.I. Reactive Blue 72, and C.I. Direct Blue 87 are represented by the following formulae (1), (2), (3), and (4), respectively. A group represented by "—SO$_3$Na" in each of the chemical formulae herein refers to "—SO$_3^-$" with a counter ion "Na$^+$". However, the counter ion of the "—SO$_3^-$" group in each of the formulae may independently be "H$^+$", "Li$^+$", or "K$^+$".

C.I. Reactive Blue 13: formula (1)

C.I. Reactive Blue 15: formula (2)

C.I. Reactive Blue 72: formula (3)

In the formula (3), each of three functional groups (—SO2-) is bonded to any one of the outer rings of the heterocycle (phthalocyanine ring). Thus, C.I. Reactive Blue 72 is a mixture of multiple types of compounds.

C.I. Direct Blue 87: formula (4)

Specific examples of a dye containing chromium with which the hue angle ∠h° defined by the CIELAB color space on a recording medium can easily range from 260 to 310 degrees in the ink jet ink composition for textile printing include C.I. Acid Blue 193.

The chemical structure of C.I. Acid Blue 193 is represented by the following formula (5).

C.I. Acid Blue 193: formula (5)

Copper or chromium in the dye can provide high color developability and high temporal stability of hue (light fastness) irrespective of the type of textile to be printed.

In contrast, without copper, even a dye with which the hue angle ∠h° defined by the CIELAB color space on a recording medium can range from 260 to 310 degrees in the ink jet ink composition for textile printing does not necessarily provide sufficient color developability of a printed textile and stability of hue (light fastness).

Examples of a dye free of copper or chromium with which the hue angle ∠h° defined by the CIELAB color space can easily range from 220 to 310 degrees include C.I. Reactive Blue 49 and C.I. Acid Blue 112 represented by the following formulae (6) and (7).

(7)

1.1.2. Hue Angle ∠h° Defined by CIELAB Color Space

A dye in the ink jet ink composition for textile printing according to the present embodiment has a hue angle ∠h° defined by the CIELAB color space on a recording medium in the range of 260 to 310 degrees.

The hue angle ∠h° defined by the CIELAB color space is a hue parameter calculated using the following formula from the color coordinates a* and b* of the L*a*b* color space, which is a perceptually almost uniform color space recommend by International Commission on Illumination (CIE) in 1976.

$$\text{Hue angle } \angle h° = \tan^{-1}(b*/a*)$$

The hue angle ∠h° is also the correlate of hue calculated using the formula (11) in "4.2 Correlates of lightness, chroma, and hue" in "3.6 CIELAB 1976 a,b hue-angle" in Japanese Industrial Standards JIS Z 8781-4: 2013 "Colorimetry-Part 4: CIE 1976 L*a*b* Color Space" (also see 03087 of JIS Z 8113). The "CIE 1976 L*a*b*" can also be called "CIELAB".

The hue angle ∠h° defined by the CIELAB color space "on a recording medium" with respect to an ink jet ink composition for textile printing defined in the present specification can be determined by measurement according to "5. Spectrophotometric colorimetry" in Japanese Industrial Standards JIS Z 8722: 2009 "Methods of color measurement-Reflecting and transmitting objects", for example. The following are measurement conditions.

(1) Prepare an ink jet ink composition for textile printing.
(2) Apply the ink to a textile to be printed.
(3) Allow the ink to react sufficiently by heating, steam, or the like.
(4) Wash the textile.
(5) Perform spectrocolorimetry.

The hue angle ∠h° is calculated from the measurement results as the hue angle ∠h° defined by the CIELAB color space "on a recording medium" with respect to an ink jet ink composition for textile printing. The recording material is preferably white.

The hue angle ∠h° defined by the CIELAB color space on a recording medium can be adjusted to range from 260 to 310 degrees by changing the dye or by mixing with a dye with a different hue angle. More specifically, the hue angle ∠h° defined by the CIELAB color space on a recording medium can be adjusted by changing the number of aromatic rings or substituents or the type of aromatic ring or substituent to modify a conjugated system in a specific dye, by changing the central metal in a specific dye, or by mixing a specific dye with another dye.

Among these methods, when the hue angle is adjusted by mixing the ink jet ink composition for textile printing with another dye, the amount of the other dye is preferably smaller, for example, 1% or less by mass, preferably 0.5% or less by mass, more preferably 0.3% or less by mass, still more preferably 0.1% or less by mass, particularly preferably 0.05% or less by mass, of the ink jet ink composition for textile printing. Thus, even when each dye fades over time, the change in hue angle in a printed portion can be reduced. When another dye is mixed, the other dye preferably has a hue angle closer to the hue angle of the original dye. In this case, the amount of the other dye can be increased, for example, to 2% or less by mass, preferably 1% or less by mass, more preferably 0.5% or less by mass, still more preferably 0.3% or less by mass, particularly preferably 0.1% or less by mass, of the ink jet ink composition for textile printing.

Although multiple types of dyes containing copper or chromium may be used, a single type of dye is preferably used in order to reduce the change in hue angle in a printed portion. When a dye containing copper or chromium is used as the other dye, the dye can be used in the amount described above depending on the hue angle of the other dye containing copper or chromium.

The ink jet ink composition for textile printing according to the present embodiment preferably only contains at least one dye containing copper or chromium, more preferably only a dye containing copper or chromium. In this case, a dye free of copper and chromium may be contained as an impurity. More specifically, the total amount of dyes contained as impurities is 1% or less by mass, preferably 0.1% or less by mass, more preferably 0.01% or less by mass, still more preferably 0.001% or less by mass, particularly preferably 0.0001% or less by mass, of the dye(s) in the ink jet ink composition for textile printing. This enables textile printing substantially only with a dye containing copper or chromium and is further desirable because a printed portion has a negligible change in hue angle even when the dye fades over time.

The total amount of dye(s) containing copper or chromium in the ink jet ink composition for textile printing according to the present embodiment ranges from 2% to 30% by mass, preferably 3% to 15% by mass, more preferably 4% to 10% by mass, of the total mass of the ink jet ink composition for textile printing.

A dye in the ink jet ink composition for textile printing according to the present embodiment is at least one (one or more) selected from C.I. Reactive Blue 13 and C.I. Acid Blue 193. The selection of such a dye can produce a color with a hue angle ∠h° in the range of 260 to 310 degrees with high color developability in printed textiles without color mixing of different colors, and can reduce the temporal hue change (higher light fastness). Thus, the presence of at least a dye containing copper or chromium can provide high color developability in printed textiles. The use of at least one selected from C.I. Reactive Blue 13 and C.I. Acid Blue 193 can more easily produce a color with a hue angle ∠h° in the range of 260 to 310 degrees without color mixing of different colors and can greatly reduce the temporal hue change (higher light fastness).

Furthermore, C.I. Reactive Blue 13 can be used alone to produce a color with a hue angle ∠h° in the range of 260 to 300 degrees without color mixing of different colors. The hue angle ∠h° defined by the CIELAB color space on a recording medium may range from 260 to 300 degrees.

Such an ink jet ink composition for textile printing can produce a color in such a range without color mixing of different colors on a textile to be printed, for example, cotton, silk, wool, viscose (rayon), or a polyamide (PA)

elastomer, and can further reduce the temporal hue change (higher light fastness). This can provide better light fastness (a smaller temporal hue change) than a composite ink containing multiple types of dyes or a known technique of producing a navy blue hue by combining inks of different hues (for example, producing a navy blue color with an ink set of four YMCK colors).

Although the dye in the ink jet ink composition for textile printing according to the present embodiment is described above, the dye is more preferably a dye containing copper or chromium with a maximum absorption wavelength in the range of 550 to 700 nm.

The maximum absorption wavelength can be measured by dissolving a dye in a solvent (water, an organic solvent, or a liquid mixture thereof) at an appropriate concentration to prepare a solution and measuring the light absorption spectrum of the solution in the visible light region. Even in the case where the light absorption spectrum in the visible light region has a plurality of peaks, the maximum absorption wavelength refers to the wavelength of the maximum absorbance. The maximum absorption wavelength of a dye can be measured even in an ink composition in which the dye is dissolved. Depending on the concentration of the dye, the ink composition can be diluted 500- to 2000-fold with water to prepare a diluted solution for the measurement.

A dye with a maximum absorption wavelength in the range of 550 to 700 nm typically produces a color with a hue angle ∠h° in the range of 220 to 310 degrees. C.I. Reactive Blue 13, C.I. Reactive Blue 15, C.I. Reactive Blue 72, C.I. Acid Blue 193, and C.I. Direct Blue 87 have a maximum absorption wavelength in the range of 550 to 700 nm.

Although the dye in the ink jet ink composition for textile printing according to the present embodiment is described above, the dye is particularly preferably a dye containing copper or chromium with a maximum absorption wavelength in the range of 550 to 600 nm. A dye with a maximum absorption wavelength in the range of 550 to 600 nm typically produces a color with a hue angle ∠h° in the range of 260 to 310 degrees. C.I. Reactive Blue 13 and C.I. Acid Blue 193 have a maximum absorption wavelength in the range of 550 to 600 nm.

C.I. Reactive Blue 13, C.I. Reactive Blue 15, C.I. Reactive Blue 72, C.I. Acid Blue 193, and C.I. Direct Blue 87 have the following maximum absorption wavelengths.

Maximum absorption wavelength of C.I. Reactive Blue 13: 567 nm

Maximum absorption wavelength of C.I. Reactive Blue 15: 672 nm

Maximum absorption wavelength of C.I. Reactive Blue 72: 668 nm

Maximum absorption wavelength of C.I. Acid Blue 193: 577 nm

Maximum absorption wavelength of C.I. Direct Blue 87: 666 nm

Figure 1:
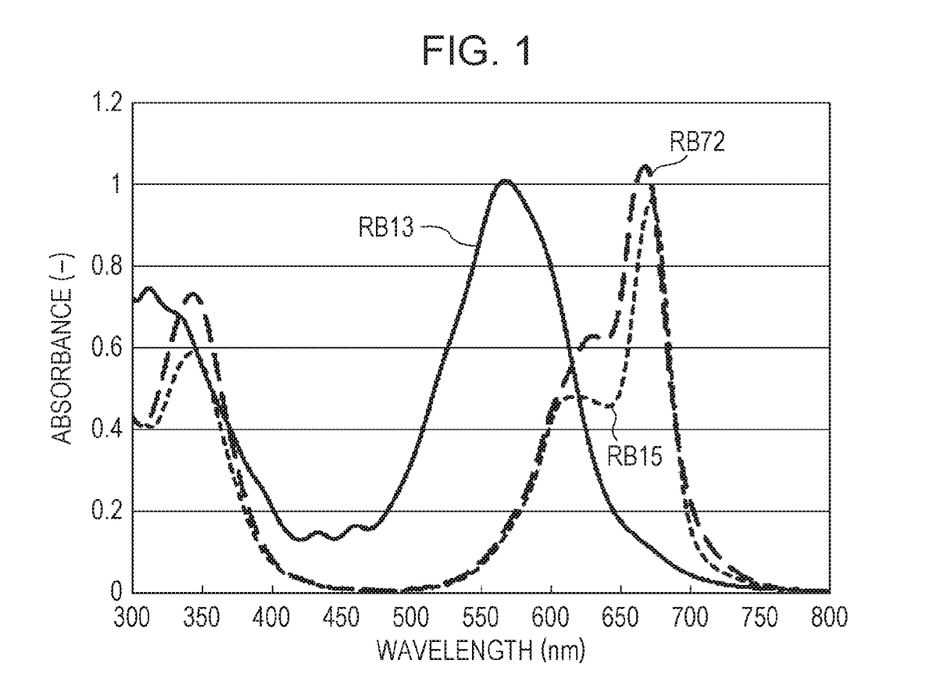
FIG. 1 shows the light absorption spectra of C.I. Reactive Blue 13 (RB13), C.I. Reactive Blue 15 (RB15), and C.I. Reactive Blue 72 (RB72) in the visible light region.
Figure 2:
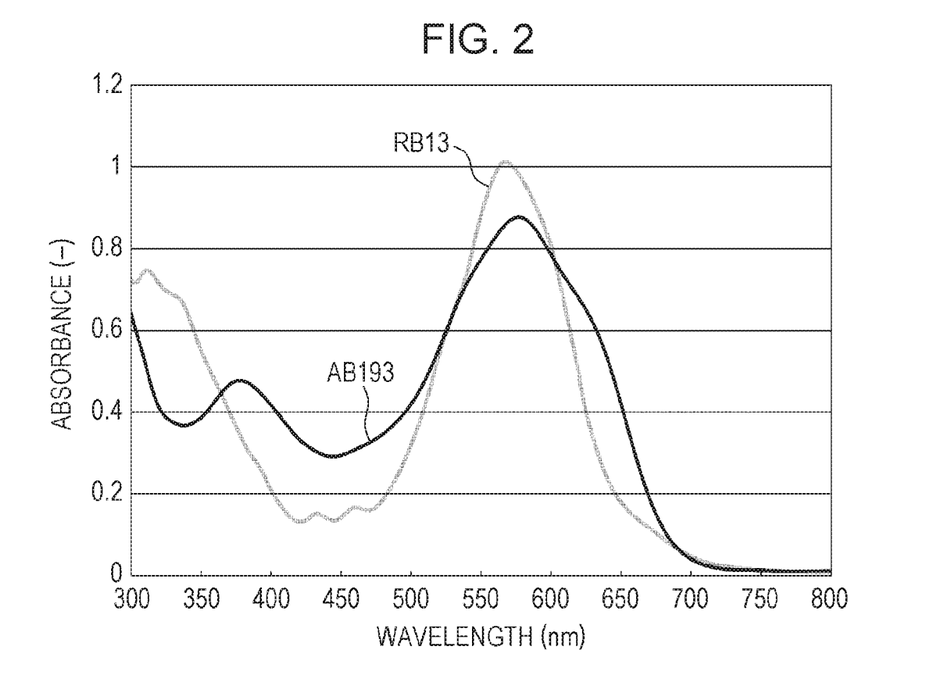
FIG. 2 shows the light absorption spectra of C.I. Reactive Blue 13 (RB13) and C.I. Acid Blue 193 (AB193) in the visible light region.

FIG. 1 shows the light absorption spectra of C.I. Reactive Blue 13, C.I. Reactive Blue 15, and C.I. Reactive Blue 72. FIG. 2 shows the light absorption spectra of C.I. Reactive Blue 13 and C.I. Acid Blue 193.

The spectra in FIGS. 1 and 2 were measured in an aqueous solution containing 10 ppm of dye with a double-beam spectrophotometer U-3300 (trade name, manufactured by Hitachi High-Technologies Corporation) using a quartz cell with an optical path length of 10 mm. The light absorption spectrum of a dye may be measured by any other method.

1.2. Cyclic Amide

The ink jet ink composition for textile printing according to the present embodiment contains a cyclic amide that is liquid at normal temperature (25° C. or more preferably 23° C.) and that has a normal boiling point (at 1 atm pressure) in the range of 190° C. to 260° C. Such a cyclic amide has the functions of facilitating the dissolution of such a dye as described above and suppressing solidification or drying of the ink jet ink composition for textile printing. With a normal boiling point in the range of 190° C. to 260° C., the cyclic amide has sufficiently low volatility and high moisture-holding capacity, thereby more effectively suppressing solidification or drying of the ink jet ink composition for textile printing.

The cyclic amide may be a compound with a ring structure including an amide group, for example, a compound represented by the following formula (8).

(8)

In the formula (8), $R^1$ denotes hydrogen or an alkyl group with 1 to 4 carbon atoms, and n denotes an integer in the range of 1 to 4. The alkyl group may be linear or branched.

The compound represented by the formula (8) may be a γ-lactam, β-lactam, or δ-lactam, such as 2-pyrrolidone [245° C.], 1-methyl-2-pyrrolidone [204° C.] (N-methyl-2-pyrrolidone), 1-ethyl-2-pyrrolidone [212° C.] (N-ethyl-2-pyrrolidone), N-vinyl-2-pyrrolidone [193° C.], 1-propyl-2-pyrrolidone, or 1-butyl-2-pyrrolidone. The figures in parentheses indicate the normal boiling points. These cyclic amides may be used alone or in combination.

Among cyclic amide compounds, compounds that are liquid at normal temperature include 2-pyrrolidone (25° C.), 1-methyl-2-pyrrolidone (−24° C.), 1-ethyl-2-pyrrolidone (−77° C.), and N-vinyl-2-pyrrolidone (14° C.) The figures in parentheses indicate the melting points. Although 2-pyrrolidone has a high melting point of 25° C. and may be solid at normal temperature (for example, at room temperature, 23° C., 25° C., etc.) at the time of purchase, after melting, for example, with warm water at approximately 40° C., 2-pyrrolidone can maintain the liquid state at normal temperature. The present inventors assume that this phenomenon results from the supercooled state or freezing point depression due to water or the like. In the invention, such a state is also considered to be liquid at normal temperature.

The total cyclic amide content ranges from 1% to 30% by mass, preferably 5% to 30% by mass, more preferably 5% to 25% by mass, still more preferably 7% to 15% by mass, of the total mass of the ink composition.

A total cyclic amide content in this range results in sufficient dissolution of a dye and an increase in the amount (concentration) of a dye containing copper or chromium to be used. More specifically, among dyes containing copper or chromium, some dyes (for example, C.I. Reactive Blue 13, C.I. Reactive Blue 15, C.I. Reactive Blue 72, and C.I. Acid Blue 193, particularly at least one of C.I. Reactive Blue 13 and C.I. Acid Blue 193) do not necessarily have high solubility in the ink jet ink composition for textile printing, and therefore it is relatively difficult to increase the concentration of the dyes to improve color development. However, the use of the cyclic amide can increase the amount of dye(s) containing copper or chromium and further improve the color developability of a printed textile.

1.3. Other Components

The ink jet ink composition for textile printing according to the present embodiment can contain the following components as well as the components described above.

1.3.1. Alkyl Polyol

The ink jet ink composition for textile printing according to the present embodiment may contain an alkyl polyol with a normal boiling point in the range of 180° C. to 260° C. Such an alkyl polyol can further increase the moisture retention of the ink jet ink composition for textile printing, improve ejection stability in the ink jet method, and effectively reduce water evaporation from a recording head when the recording head is unused for extended periods. This ensures high recoverability from long-term clogging and high continuous ejection stability even when a dye used is likely to cause nozzle clogging.

Specific examples of the alkyl polyol with a normal boiling point in the range of 180° C. to 260° C. include, 1,2-butanediol [194° C.], 1,2-pentanediol [210° C.], 1,2-hexanediol [224° C.], 1,2-heptanediol [227° C.], 1,3-propanediol [210° C.], 1,3-butanediol [230° C.], 1,4-butanediol [230° C.], 1,5-pentanediol [242° C.], 1,6-hexanediol [250° C.], 2-ethyl-2-methyl-1,3-propanediol [226° C.], 2-methyl-2-propyl-1,3-propanediol [230° C.], 2-methyl-1,3-propanediol [214° C.], 2,2-dimethyl-1,3-propanediol [210° C.], 3-methyl-1,3-butanediol [203° C.], 2-ethyl-1,3-hexanediol [244° C.], 3-methyl-1,5-pentanediol [250° C.], 2-methylpentane-2,4-diol [197° C.], diethylene glycol [245° C.], and dipropylene glycol [232° C.]. The figures in parentheses indicate the normal boiling points. These alkyl polyols may be used alone or in combination.

The effective amount of the alkyl polyol with a normal boiling point in the range of 180° C. to 260° C. is 5% or more by mass, preferably 5% to 30% by mass, more preferably 8% to 27% by mass, still more preferably 10% to 25% by mass, of the total mass of the ink jet ink composition for textile printing.

The ink jet ink composition for textile printing according to the present embodiment contains no alkyl polyol with a normal boiling point of 260° C. or more. This is because alkyl polyols with a normal boiling point of 260° C. or more are likely to reduce the dyeing affinity of dyes and the color reproducibility and color developability of images. Specific examples of alkyl polyols with a normal boiling point of 260° C. or more include triethylene glycol [287° C.] and glycerin [290° C.]

The phrase "contains no A", as used herein, refers not only to containing no A but also to no intentional addition of A in the production of a composition, and includes inevitable contamination or generation of a minute amount of A during the production or storage of the composition. Specific examples of "contains no . . . " include not containing 1.0% or more by mass, preferably 0.5% or more by mass, more preferably 0.1% or more by mass, still more preferably 0.05% or more by mass, particularly preferably 0.01% or more by mass.

1.3.2. Surfactant

The ink jet ink composition for textile printing according to the present embodiment may contain a surfactant. The surfactant can be used to reduce the surface tension of the ink jet ink composition for textile printing and to adjust or improve wettability to a recording medium (penetrability to a textile). The surfactant may be a nonionic surfactant, an anionic surfactant, a cationic surfactant, an amphoteric surfactant, or a combination thereof. Among such surfactants, acetylene glycol surfactants, silicone surfactants, and fluorinated surfactants are preferred.

Examples of the acetylene glycol surfactants include, but are not limited to, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (trade names, manufactured by Air Products and Chemicals. Inc.), Olfin B, Y, P, A, STG, SPC, E1004, E1010, PD-001, PD-002W, PD-003, PD-004, PD-005, EXP.4001, EXP.4036, EXP.4051, AF-103, AF-104, AK-02, SK-14, and AE-3 (trade names, manufactured by Nissin Chemical Industry Co., Ltd.), and Acetylenol E00, E00P, E40, and E100 (trade names, manufactured by Kawaken Fine Chemicals Co., Ltd.).

Preferred examples of the silicone surfactants include, but are not limited to, polysiloxane compounds. Examples of the polysiloxane compounds include, but are not limited to, polyether-modified organosiloxanes. Examples of the commercial products of the polyether-modified organosiloxanes include BYK-306, BYK-307, BYK-333, BYK-341, BYK-345, BYK-346, and BYK-348 (trade names, manufactured by BYK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

Preferred examples of the fluorinated surfactants include fluorine-modified polymers, for example, BYK-340 (manufactured by BYK Japan KK).

The total amount of surfactant(s), if present, in the ink jet ink composition for textile printing ranges from 0.01% to 3% by mass, preferably 0.05% to 2% by mass, more preferably 0.1% to 1.5% by mass, particularly preferably 0.2% to 1% by mass, of the ink jet ink composition for textile printing.

A surfactant in the ink jet ink composition for textile printing tends to increase stability in the ejection of ink from a head. The use of an appropriate amount of surfactant can improve penetrability to a textile and increase the contact area with a pretreatment composition.

1.3.3. pH-Adjusting Agent

The ink composition according to the present embodiment may contain a pH-adjusting agent to adjust pH. The pH-adjusting agent may be, but is not limited to, a combination of an acid, a base, a weak acid, and a weak base. Examples of an acid and a base used in such a combination include inorganic acids, such as sulfuric acid, hydrochloric acid, and nitric acid, inorganic bases, such as lithium hydroxide, sodium hydroxide, potassium hydroxide, potassium dihydrogen phosphate, disodium hydrogen phosphate, potassium carbonate, sodium carbonate, sodium hydrogen carbonate, and ammonia, organic bases, such as triethanolamine, diethanolamine, monoethanolamine, tripropanolamine, triisopropanolamine, diisopropanolamine, and trishydroxymethylaminomethane (THAM), organic acids, such as adipic acid, citric acid, succinic acid, and lactic acid. Good's buffers, such as N,N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyliminobisacetic acid (ADA), piperazine-1,4-bis(2-ethanesulfonic acid) (PIPES), N-(2-acetamide)-2-aminoethanesulfonic acid (ACES), cholamine chloride, N-tris(hydroxymethyl)methyl-2-aminoethanesulfonic acid (TES), acetamidoglycine, tricine, glycinamide, and bicine, phosphate buffers, citric acid buffers, and Tris buffers may also be used. Among these, a tertiary amine, such as triethanolamine or triisopropanolamine, and/or an organic acid with a carboxy group, such as adipic acid, citric acid, succinic acid, or lactic acid, is preferably partly or entirely used as the pH-adjusting agent in order to produce more stable pH-buffering effects.

1.3.4. Water

The ink jet ink composition for textile printing according to the present embodiment may contain water. Examples of the water include pure waters, such as ion-exchanged water, ultrafiltered water, reverse osmosis water, and distilled water, and waters from which ionic impurities are removed as much as possible, such as ultrapure water. The use of water sterilized by ultraviolet irradiation or by the addition of hydrogen peroxide can reduce the growth of bacteria and fungi during long-term storage of the ink jet ink composition for textile printing.

The water content is 30% or more by mass, preferably 40% or more by mass, more preferably 45% or more by mass, still more preferably 50% or more by mass, of the total amount of the ink jet ink composition for textile printing. The term "water" in the ink jet ink composition for textile printing includes a resin particle dispersion liquid used as a raw material and water added, for example. A water content of 30% or more by mass can result in the ink jet ink composition for textile printing with a relatively low viscosity. The upper limit of the water content is preferably 90% or less by mass, more preferably 85% or less by mass, still more preferably 80% or less by mass, of the total amount of the ink jet ink composition for textile printing.

1.3.5. Organic Solvent

The ink jet ink composition for textile printing according to the present embodiment may contain a cyclic amide with a normal boiling point of less than 190° C. or more than 260° C., a nitrogen-containing heterocyclic compound, and/or a water-soluble organic solvent. The cyclic amide with a normal boiling point of less than 190° C. or more than 260° C. may be a lactam, such as ε-caprolactam [136° C.]. The water-soluble organic solvent may be a lactone, such as γ-butyrolactone [204° C.], or a betaine compound. The ink jet ink composition for textile printing according to the present embodiment may contain a glycol ether, with which the wettability and penetration speed of the composition may be controlled. This may improve the color developability of images.

The glycol ether with a normal boiling point in the range of 190° C. to 260° C. is preferably a glycol monoalkyl ether selected from ethylene glycol, diethylene glycol, triethylene glycol, poly(ethylene glycol), propylene glycol, dipropylene glycol, tripropylene glycol, poly(propylene glycol), and polyoxyethylene polyoxypropylene glycol. More preferably, the glycol ether with a normal boiling point in the range of 190° C. to 260° C. may be methyltriglycol (triethylene glycol monomethyl ether), butyltriglycol (triethylene glycol monobutyl ether), butyl diglycol (diethylene glycol monobutyl ether), or dipropylene glycol monopropyl ether, typically diethylene glycol monobutyl ether [230° C.]. The figures in parentheses indicate the normal boiling points.

Such organic solvents may be used in combination. In order to control the viscosity of the ink jet ink composition for textile printing and to prevent clogging by the moisturizing effects, the total amount of organic solvent(s) ranges from 0.2% to 30% by mass, preferably 0.4% to 20% by mass, more preferably 0.5% to 15% by mass, still more preferably 0.7% to 10% by mass, of the total amount of the ink jet ink composition for textile printing.

1.3.6. Urea

A urea may be used as a humectant in the ink jet ink composition for textile printing or as a dyeing aid for improving the dyeing affinity of a dye. Specific examples of the urea include urea, ethyleneurea, tetramethylurea, thiourea, and 1,3-dimethyl-2-imidazolidinone. The amount of urea, if present, ranges from 1% to 10% by mass of the total mass of the ink composition.

1.3.7. Saccharide

A saccharide may be used to prevent solidification or drying of the ink jet ink composition for textile printing. Specific examples of the saccharide include, glucose, mannose, fructose, ribose, xylose, arabinose, galactose, aldonic acid, glucitol (sorbitol), maltose, cellobiose, lactose, sucrose, trehalose, and maltotriose.

1.3.8. Chelating Agent

A chelating agent may be used to remove unnecessary ions from the ink jet ink composition for textile printing. Examples of the chelating agent include ethylenediaminetetraacetic acid and salts thereof (disodium dihydrogen ethylenediaminetetraacetate, or ethylenediamine nitrilotriacetate, hexametaphosphate, pyrophosphate, or metaphosphate, etc.).

1.3.9. Preservative, Fungicide

The ink jet ink composition for textile printing may contain a preservative and/or a fungicide. Examples of the preservative and fungicide include sodium benzoate, pentachlorophenol sodium, 2-pyridinethiol-1-oxide sodium, sodium sorbate, sodium dehydroacetate, 1,2-benzisothiazolin-3-one (Proxel CRL, Proxel BDN, Proxel GXL, Proxel XL.2, Proxel TN, and Proxel LV, manufactured by Zeneca), and 4-chloro-3-methylphenol (Preventol CMK manufactured by Bayer AG, etc.).

1.3.10. Others

In addition to these components, additive agents generally used in ink compositions for ink jet, such as an anticorrosive, an antioxidant, an ultraviolet absorber, an oxygen absorbent, and/or a dissolution aid may be used.

The ink jet ink composition for textile printing according to the present embodiment includes a dye containing copper or chromium. Copper or chromium may be eliminated from the chemical structure of the dye. Thus, the ink jet ink composition for textile printing may contain free copper or chromium (including ions). Free copper or chromium, if present, in the ink jet ink composition for textile printing causes a relatively small change in hue or color developability and is therefore less likely to cause significant problems. Furthermore, a chelating agent, if present, in the ink jet ink composition for textile printing solubilizes copper or chromium by forming a complex and can thereby sufficiently prevent defects, such as deposition of copper or chromium on the flow path.

In an ink jet ink composition containing a dye containing copper or chromium and an anticorrosive with a particular molecular structure, however, the anticorrosive molecule and copper or chromium may form a complex with a very flat structure. The present inventors have found that a very flat complex energetically favors overlap packing over solvation (hydration) and is therefore likely to precipitate.

C.I. Reactive Blue 13, which is exemplified as a dye usable in the ink jet ink composition for textile printing according to the present embodiment, has a smaller number of coordinate bonds to copper than C.I. Reactive Blue 15 and C.I. Reactive Blue 72 (see the formulae (1) to (3)), and is therefore more likely to release copper. Thus, particularly when C.I. Reactive Blue 13 is used, an anticorrosive with a particular molecular structure is more likely to form foreign matter derived from the dye.

From this viewpoint, the present inventors have found that a compound that can form a complex with copper or chromium and thereby has a very flat structure has a benzotriazole skeleton. Such a compound with a benzotriazole skeleton is often used as an anticorrosive to protect a metal member containing stainless steel or copper in an ink jet recording apparatus. The use of such a compound in combination with a dye containing copper or chromium is likely to produce foreign matter and consequently cause nozzle clogging or ejection failure.

For this reason, the ink jet ink composition for textile printing according to the present embodiment preferably contains no compound with a benzotriazole skeleton. Examples of compounds with a benzotriazole skeleton include 1,2,3-benzotriazole (including its tautomer), carboxybenzotriazoles (with one or more carboxy groups on the benzene ring), 1,2,3-benzotriazole salts (with a counter ion, sodium, potassium, lithium, etc.), and hydroxybenzotriazoles (including their hydrates). Examples of the commercial products of these compounds include trade names BT-120, CBT-1, and JCL-400, manufactured by Johoku Chemical Co., Ltd., and other commercially available reagents.

1.4. pH of Ink Jet Ink Composition for Textile Printing

The ink jet ink composition for textile printing according to the present embodiment preferably has a pH in the range of 5.8 to 10.5, more preferably 6.0 to 10.0, still more preferably 6.0 to 9.5, still more preferably 7.0 to 8.5. In the ink jet ink composition for textile printing with a pH in this range, a dye in the ink composition has improved storage stability, and the resulting images are less likely to have color developability and hue changes. Thus, predetermined design colors can be well reproduced.

The pH of the ink jet ink composition for textile printing can be adjusted to be in the range, for example, by changing the liquidity of a dye, the type of counter ion of an ionic dye and a balance thereof, or the type or amount of pH-adjusting agent.

1.5. Production and Physical Properties of Ink Composition

The ink composition according to the present embodiment is produced by mixing the components in any order and, if necessary, filtering the mixture to remove impurities. The components are preferably sequentially charged and mixed in a container equipped with an agitator, such as a mechanical stirrer or a magnetic stirrer.

The ink composition according to the present embodiment preferably has a surface tension in the range of 20 to 40 mN/m, more preferably 22 to 35 mN/m, from the perspective of the balance between printing quality and reliability as the ink jet ink for textile printing. From the same perspective, the ink composition preferably has a viscosity in the range of 1.5 to 10 mPa·s, more preferably 2 to 8 mPa·s, at 20° C. The surface tension and viscosity can be adjusted to be in these ranges by changing the type of water-soluble solvent and the type of surfactant and by changing the amount of water-soluble solvent, surfactant, and water.

1.6. Operational Advantages

The ink jet ink composition for textile printing according to the present embodiment can produce a color with a hue angle $\angle h°$ in the range of 260 to 310 degrees with high color developability in printed textiles without color mixing of different colors, and can reduce the temporal hue change (higher light fastness). In other words, high color developability in printed textiles can be achieved by the ink jet ink composition including a dye containing copper or chromium and 5% to 30% by mass of a cyclic amide with a normal boiling point in the range of 190° C. to 260° C., the cyclic amide enabling a sufficient amount of the dye to be dissolved in the ink jet ink composition. Furthermore, a color with a hue angle $\angle h°$ in the range of 260 to 310 degrees can be produced without color mixing of different colors, and the temporal hue change can be reduced (higher light fastness).

2. Ink Set

The ink jet ink composition for textile printing according to the present embodiment, an ink jet ink composition for textile printing containing a dye of another color, and a pretreatment composition described later can be combined in any number of compositions and in any number of colors to compose an ink set.

The ink set according to the present embodiment can produce a color with a hue angle $\angle h°$ in the range of 260 to 310 degrees with high color developability in printed textiles without color mixing of different colors, and can reduce the temporal hue change (higher light fastness). Thus, the presence of at least a dye containing copper or chromium can provide high color developability in printed textiles. The use of at least one selected from C.I. Reactive Blue 13 and C.I. Acid Blue 193 can produce a color with a hue angle $\angle h°$ in the range of 260 to 310 degrees without color mixing of different colors and can greatly reduce the temporal hue change (higher light fastness).

The ink jet ink composition for textile printing according to the present embodiment, together with a pretreatment composition described later, can compose an ink set. The pretreatment composition can further improve textile printing.

The ink set according to the present embodiment can produce a color with a hue angle $\angle h°$ in the range of 260 to 310 degrees without color mixing of different colors, and can reduce the temporal hue change (higher light fastness) at least in a printed portion of the color in the hue angle range.

3. Recording Method (Printing Method)

A recording method according to the present embodiment includes a process of applying the ink jet ink composition for textile printing to a textile (hereinafter also referred to as a "printing process"). A process that is or can be included in the recording method according to the present embodiment will be described below.

3.1. Recording Medium

The ink jet ink composition for textile printing according to the present embodiment is applied to a recording medium. The recording medium may be, but is not limited to, a textile. The material for the textile may be, but is not limited to, natural fiber, such as cotton, hemp, wool, or silk, synthetic fiber, such as polypropylene, polyester, acetate, triacetate, polyamide, or polyurethane, biodegradable fiber, such as poly(lactic acid), or a mixed fiber thereof. The textile may be a fabric, knit fabric, or nonwoven fabric of the fiber. Among these, the textile for use in the present embodiment is more preferably formed of fiber containing cellulose, such as cotton or hemp. The use of such a textile can improve the dyeing affinity of the ink jet ink composition for textile printing.

The mass per unit area of a textile used in the present embodiment ranges from 1.0 to 10.0 oz (ounce), preferably 2.0 to 9.0 oz, more preferably 3.0 to 8.0 oz, still more preferably 4.0 to 7.0 oz.

3.2. Pretreatment Process

The recording method according to the present embodiment may include a pretreatment process of applying a pretreatment composition containing at least one of an alkaline agent, an acid, and a hydrotropic agent to a textile. This further improves the dyeing affinity of a dye.

The pretreatment composition can be applied to a textile, for example, by immersing the textile in the pretreatment composition, by applying the pretreatment composition to the textile with a roll coater, or by ejecting the pretreatment composition (for example, an ink jet method or a spray method).

Pretreatment Composition

The pretreatment composition contains at least one of an alkaline agent, an acid, and a hydrotropic agent. The amounts of these components in the pretreatment composition depend on the type of textile and are not particularly limited.

When a reactive dye is used, an alkaline agent is preferably used to further improve the dyeing affinity of the reactive dye. Specific examples of the alkaline agent include, sodium carbonate, sodium hydrogen carbonate, sodium hydroxide, trisodium phosphate, and sodium acetate.

When an acidic dye is used, an acid is preferably used to further improve the dyeing affinity of the dye. Specific examples of the acid include organic acids, such as organic carboxylic acids with a carboxy group in the molecule and organic sulfonic acids with a sulfo group in the molecule, and ammonium salts of strong acids. Among these, ammonium sulfate is particularly preferred.

A hydrotropic agent is preferably used to improve the color developability of images recorded. The hydrotropic agent may be a urea that is exemplified in the section of the ink jet ink composition for textile printing.

The pretreatment composition in the present embodiment may contain water. The water is described above with respect to the ink jet ink composition for textile printing. The water content is 30% or more by mass, preferably 40% or more by mass, more preferably 45% or more by mass, still more preferably 50% or more by mass, of the total amount of the pretreatment composition.

The pretreatment composition in the present embodiment may contain a water-soluble organic solvent. The water-soluble organic solvent may improve the wettability of the pretreatment composition to a recording medium. The water-soluble organic solvent may be at least one of esters, alkylene glycol ethers, cyclic esters, and alkoxyalkylamides. The water-soluble organic solvent may also be a nitrogen-containing compound, a saccharide, or an amine. The pretreatment composition may contain a water-soluble organic solvent for use in the ink jet ink composition for textile printing.

The pretreatment composition may contain two or more water-soluble organic solvents. The total amount of water-soluble organic solvent(s), if present, in the pretreatment composition ranges from 0.1% to 20% by mass, preferably 0.3% to 15% by mass, more preferably 0.5% to 10% by mass, still more preferably 1% to 7% by mass, of the pretreatment composition.

The pretreatment composition may contain a sizing agent. Examples of the sizing agent include starches, such as maize and wheat, celluloses, such as carboxymethylcellulose and hydroxymethylcellulose, polysaccharides, such as sodium alginate, gum arabic, locust bean gum, gum tragacanth, guar gum, and tamarind seed, proteins, such as gelatin and casein, natural water-soluble polymers, such as tannin and lignin, and synthetic water-soluble polymers, such as poly(vinyl alcohol) compounds, poly(ethylene oxide) compounds, acrylic acid compounds, and maleic anhydride compounds.

The pretreatment composition in the present embodiment may contain a surfactant. The surfactant is described above with respect to the ink jet ink composition for textile printing. The total amount of surfactant(s), if present, in the pretreatment composition preferably ranges from 0.01% to 3% by mass, more preferably 0.05% to 2% by mass, still more preferably 0.1% to 1% by mass, particularly preferably 0.2% to 0.5% by mass, of the pretreatment composition.

A surfactant in the pretreatment composition can control the penetrability and wettability of ink applied to a pretreated textile and can thereby improve the color developability or suppress the blurring of a printed textile.

The pretreatment composition in the present embodiment may contain components commonly used in pretreatment compositions for textile printing, such as water, a reduction inhibitor, a preservative, a fungicide, a chelating agent, a pH-adjusting agent, a surfactant, a viscosity modifier, an antioxidant, and a fungicide. Unlike the ink jet ink composition for textile printing, the pretreatment composition may contain an anticorrosive (including an anticorrosive with a benzotriazole skeleton).

The pretreatment composition may be applied to a textile by an ink jet method and, in this case, preferably has a viscosity in the range of 1.5 to 15 mPa·s, more preferably 1.5 to 5 mPa·s, still more preferably 1.5 to 3.6 mPa·s, at 20° C.

The pretreatment composition may be applied by a method other than the ink jet method. Such a method may be a noncontact method or a contact method or a combination thereof, such as a method for applying a pretreatment composition to a textile with a spray, a method for immersing a textile in a pretreatment composition, or a method for applying a treatment liquid to a textile with a brush.

A pretreatment composition to be applied to a textile by a method other than the ink jet method may have a higher viscosity than that to be applied by the ink jet method, for example, preferably a viscosity in the range of 1.5 to 100 mPa·s, more preferably 1.5 to 50 mPa·s, still more preferably 1.5 to 20 mPa·s, at 20° C. The viscosity can be measured with a rheometer MCR-300 (manufactured by Physica) at 20° C. by increasing the shear rate from 10 to 1000 and reading the viscosity at a shear rate of 200.

3.3. Printing Process

The recording method according to the present embodiment includes a printing process of applying the ink jet ink composition for textile printing to a textile. More specifically, ink droplets ejected by an ink jet recording method are deposited on a textile to form an image on the textile. The ink jet recording method may be any method, for example, a charge deflection method, a continuous method, or an on-demand method (a piezoelectric method or a Bubble Jet (registered trademark) method). Among these ink jet recording methods, a method with a piezoelectric ink jet recording apparatus is particularly preferred.

3.4. Heat-Treatment Process

The recording method according to the present embodiment may include a heat-treatment process of heat-treating a textile to which the ink composition is applied. The heat-treatment process improves the dyeing of fiber. The heat-treatment process may be a known process, for example, a high-temperature steaming process (HT process), a high-pressure steaming process (HP process), or a thermosol process.

The temperature of the heat-treatment process preferably ranges from 90° C. to 110° C. in order to reduce damage to a textile.

3.5. Cleaning Process

The recording method according to the present embodiment may include a cleaning process of cleaning a printed textile. The cleaning process is preferably performed after the heat-treatment process to effectively remove dye that is not deposited on the fiber. The cleaning process may be performed with water and may involve soaping treatment, if necessary.

3.6. Another Process

The recording method according to the present embodiment may include a pretreatment composition drying process of drying the pretreatment composition on a textile after the pretreatment process and before the printing process. Although the pretreatment composition may be dried by natural drying, drying by heating is preferred due to high drying speed. Heating in the pretreatment composition drying process may be performed by any heating method, for example, a heat press method, a normal-pressure steam method, a high-pressure steam method, or a Thermofix method. The heat source may be, but is not limited to, infrared light (lamp).

3.7. Operational Advantages

In the recording method according to the present embodiment, the use of the ink jet ink composition for textile printing in the printing process can produce a color with a hue angle ∠h° in the range of 260 to 310 degrees with high color developability in printed textiles without color mixing of different colors, can reduce the temporal hue change (higher light fastness), and can improve ejection reliability (recoverability from long-term clogging or continuous ejection stability).

4. Examples and Comparative Examples

Although the invention will be further described with examples, the invention is not limited to these examples.

4.1. Preparation of Ink Jet Ink Composition for Textile Printing

The components of each composition listed in Table 1 were mixed in a container with a magnetic stirrer for 2 hours and were then filtered through a membrane filter with a pore size of 5 μm to produce ink compositions of the examples and comparative examples. The values in Table 1 are expressed in % by mass. Ion-exchanged water was added such that the total mass of each ink composition was 100% by mass.

TABLE 1

| (mass %) | | Example | | | | | | | | | | | | | | | | | | | Comparative example | | | | | |
|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 1 | 2 | 3 | 4 | 5 | 6 |
| Reactive dye | C.I. REACTIVE BLUE 13 | 7.5 | 6.5 | 7.5 | 3 | 15 | 7.5 | 7.5 | 7.5 | 2 | 18 | 7.5 | 7.5 | 7.5 | 7.5 | 7.5 | 7.5 | — | — | — | — | — | 7.5 | 7.5 | — | — |
| | C.I. REACTIVE BLUE 15 | — | 0.5 | — | — | — | — | — | — | — | — | — | — | — | — | — | — | — | — | — | — | — | — | — | — | — |
| | C.I. REACTIVE BLUE 72 | — | 0.5 | — | — | — | — | — | — | — | — | — | — | — | — | — | — | — | — | — | — | 4 | — | — | — | — |
| | C.I. REACTIVE BLUE 49 | — | — | — | — | — | — | — | — | — | — | — | — | — | — | — | — | — | — | — | 7.5 | — | — | — | — | — |
| | C.I. Reactive Red 31 | — | — | — | — | — | — | — | — | — | — | — | — | — | — | — | — | — | — | — | — | 3.5 | — | — | — | — |
| Acidic dye | C.I. Acid Blue 193 | — | — | — | — | — | — | — | — | — | — | — | — | — | — | — | — | 3 | 2 | 2.5 | — | — | — | — | — | — |
| | C.I. Direct Blue 87 | — | — | — | — | — | — | — | — | — | — | — | — | — | — | — | — | — | — | 0.5 | — | — | — | — | 7 | — |
| | C.I. Acid Blue 112 | — | — | — | — | — | — | — | — | — | — | — | — | — | — | — | — | — | — | — | — | — | — | — | — | 2 |
| | C.I. Acid Red 289 | — | — | — | — | — | — | — | — | — | — | — | — | — | — | — | — | — | — | — | — | — | — | — | — | 1 |
| Nitrogen-containing heterocyclic compound | N-ethyl-2-pyrrolidone (bp = 212° C.) | 7 | 7 | — | — | — | 7 | 7 | 7 | 7 | 7 | 7 | 7 | 7 | 7 | 7 | 7 | 7 | 7 | 7 | 7 | 7 | 7 | 7 | 7 | 7 |
| | 2-pyrrolidone (bp = 245° C.) | 7 | 7 | 7 | 6 | 15 | 7 | 7 | 7 | 7 | 25 | 7 | 7 | 7 | 12 | 7 | 7 | 7 | 7 | 7 | 7 | 7 | 4 | 31 | 7 | 7 |
| Alkyl polyol | Propylene glycol (bp = 188° C.) | 7 | 7 | 7 | 7 | 7 | 7 | 7 | 7 | 7 | 7 | 7 | 7 | 3 | 7 | 7 | 7 | 7 | 7 | 7 | 7 | 7 | 7 | 7 | 7 | 7 |
| | 1,2-hexanediol (bp = 223° C.) | 3 | 3 | 3 | 3 | 3 | 3 | 3 | 3 | 3 | 3 | 3 | 3 | 2 | 5 | 3 | 3 | 3 | 3 | 3 | 3 | 3 | 3 | 3 | 3 | 3 |
| | Diethylene glycol (bp = 245° C.) | 8 | 8 | 8 | 8 | 8 | 8 | 8 | 8 | 8 | 8 | 8 | 8 | 4 | 13 | — | 8 | 8 | 8 | 8 | 8 | 8 | 8 | 8 | 8 | 8 |
| | Triethylene glycol (bp = 287° C.) | — | — | — | — | — | — | — | — | — | — | — | — | — | — | 8 | — | — | — | — | — | — | — | — | — | — |
| pH-adjusting agent | Triethanolamine | 0.5 | 0.6 | 0.5 | 0.5 | 0.5 | — | — | — | 0.5 | 0.3 | 0.5 | — | 0.5 | 0.5 | 0.5 | 0.5 | 0.5 | 0.5 | 0.5 | 0.3 | 0.7 | 0.5 | 0.5 | 0.5 | 0.5 |
| | BES | — | — | — | — | — | 2 | — | — | — | — | — | 2 | — | — | — | — | — | — | — | — | — | — | — | — | — |
| | Tripropanolamine | — | — | — | — | — | — | 1.8 | — | — | — | — | — | — | — | — | — | — | — | — | — | — | — | — | — | — |
| | Sodium dihydrogen phosphate | — | — | — | — | — | — | — | 2 | — | — | — | — | — | — | — | — | — | — | — | — | — | — | — | — | — |
| | Disodium hydrogen phosphate | — | — | — | — | — | — | — | 2 | — | — | 1.5 | — | — | — | — | — | — | — | — | — | — | — | — | — | — |
| | Adipic acid | — | — | — | — | — | 0.5 | 0.3 | — | — | — | — | 0.11 | — | — | — | — | — | — | — | — | — | — | — | — | — |
| | NaOH | — | — | — | — | — | — | — | — | — | — | — | — | — | — | — | — | — | — | — | — | — | — | — | — | — |

TABLE 1-continued

| (mass %) | | Example | | | | | | | | | | | | | | | | | | | Comparative example | | | | | |
|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 1 | 2 | 3 | 4 | 5 | 6 |
| Anticorrosive | Benzotriazole | — | — | — | — | — | — | — | — | — | — | — | — | — | — | — | 0.2 | 0.2 | 0.2 | 0.2 | — | — | — | — | 0.2 | 0.2 |
| Other additives | Olfin PD-002W | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Urea | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| | Proxel XL2 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Water | Ion-exchanged water | Remainder | Remainder | Remainder | Remainder | Remainder | Remainder | Remainder | Remainder | Remainder | Remainder | Remainder | Remainder | Remainder | Remainder | Remainder | Remainder | Remainder | Remainder | Remainder | Remainder | Remainder | Remainder | Remainder | Remainder | Remainder |
| Total | | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 |

The components not described by their compound names in Table 1 were as follows:

C.I. Reactive Blue 13 maximum absorption wavelength: 567 nm
C.I. Reactive Blue 15 maximum absorption wavelength: 672 nm
C.I. Reactive Blue 72 maximum absorption wavelength: 668 nm
C.I. Reactive Blue 49 maximum absorption wavelength: 586 nm
C.I. Reactive Red 31 maximum absorption wavelength: 546 nm
C.I. Acid Blue 193 maximum absorption wavelength: 577 nm
C.I. Direct Blue 87 maximum absorption wavelength: 666 nm magenta, yellow, and black inks, respectively. The inks 1 in the ink sets of Examples 20 and correspond to the ink jet ink compositions for textile printing of Examples 1 and 17, respectively, except for the different coloring material concentration (5% by mass). The ink 1 in the ink set of Comparative Example 7 corresponds to the ink jet ink composition for textile printing of Comparative Example 1 except for the different coloring material concentration (5% by mass). The ink 1 in the ink set of Comparative Example 8 corresponds to the ink jet ink composition for textile printing of Comparative Example 6 except for a single coloring material (C.I. Acid Blue 112) with a different coloring material concentration (5% by mass). The inks 2 to 4 in each of the ink sets were different in the type (Table 2) and concentration (5% by mass) of coloring material from the ink jet ink composition for textile printing of Example 1.

TABLE 2

|  |  | Example | | Comparative example | |
| --- | --- | --- | --- | --- | --- |
|  |  | 20 | 21 | 7 | 8 |
| Ink components of ink set | Ink 1 | C.I. Reactive Blue 13 | C.I. Acid Blue 193 | C.I. Reactive Blue 49 | C.I. Acid Blue 112 |
|  | Ink 2 | C.I. Reactive Red 31 | C.I. Acid Red 289 | C.I. Reactive Red 31 | C.I. Acid Red 289 |
|  | Ink 3 | C.I. Reactive Yellow 2 | C.I. Acid Yellow 79 | C.I. Reactive Yellow 2 | C.I. Acid Yellow 79 |
|  | Ink 4 | C.I. Reactive Black 39 | C.I. Acid Black 172 | C.I. Reactive Black 39 | C.I. Acid Black 172 |
| Evaluation results of light fastness | Textile to be printed 100% cotton Hue angle ∠h° of printed textile 260 to 310 degrees | A | — | D | — |
|  | Textile to be printed Viscose | A | — | D | — |
|  | Textile to be printed Silk | A | A | D | D |
|  | Textile to be printed PA elastomer | — | A | — | D |
|  | Textile to be printed Wool | — | A | — | D |

C.I. Acid Blue 112 maximum absorption wavelength: 633 nm
C.I. Acid Red 289 maximum absorption wavelength: 527 nm
BES (N,N-bis(2-hydroxyethyl)-2-aminoethanesulfonic acid: reagent)
Olfin PD-002W (trade name, manufactured by Nissin Chemical Industry Co., Ltd., acetylene glycol surfactant)
Proxel XL2 (trade name, manufactured by Arch Chemicals, Inc.)

Dyes with "Reactive" in their names were classified as reactive dyes, and dyes with "Acid" or "Direct" in their names were classified as acidic dyes.

The maximum absorption wavelength of a dye was measured in an aqueous solution containing 10 ppm of the dye with a double-beam spectrophotometer U-3300 (trade name, manufactured by Hitachi High-Technologies Corporation) using a quartz cell with an optical path length of 10 mm. Spectral distributions of some dyes measured in this way are shown in FIGS. 1 and 2. The maximum absorption wavelength of a dye can be measured even in an ink composition in which the dye is dissolved. Depending on the concentration of the dye, the ink composition can be diluted 500- to 2000-fold with water to prepare a diluted solution, which is subjected to the measurement with the spectrophotometer.

4.2. Ink Set

The ink sets listed in Table 2 were produced. Each of the ink sets was composed of four types of inks: an ink 1, an ink 2, an ink 3, and an ink 4. The inks 1 to 4 correspond to cyan, Part of the dyes in Table 2 are as follows:

C.I. Reactive Yellow 2 maximum absorption wavelength: 404 nm
C.I. Reactive Black 39 maximum absorption wavelength: 610 nm
C.I. Acid Yellow 79 maximum absorption wavelength: 402 nm
C.I. Acid Black 172 maximum absorption wavelength: 573 nm 4.3. Preparation of Pretreatment Composition (1) Method for Preparing Pretreatment Liquid from Reactive Dye Five parts by mass of polyoxyethylene diisopropyl ether (oxyethylene=30 mol), 5 parts by mass of etherified carboxymethylcellulose, 100 parts by mass of urea (hydrotropic agent), and 10 parts by mass of sodium m-nitrobenzenesulfonate were well mixed and then added in small portions to 1000 parts by mass of ion-exchanged water while stirring at 60° C. for 30 minutes. Subsequently, 30 parts by mass of sodium carbonate (alkaline agent) was added to the solution while stirring. After stirring for 10 minutes, the solution was filtered through a membrane filter with a pore size of 10 μm to produce a pretreatment composition.

(2) Method for Preparing Pretreatment Liquid from Acidic Dye

A pretreatment liquid for acidic dye was prepared in the same manner as in the preparation of a pretreatment liquid for reactive dye except that sodium m-nitrobenzenesulfonate was not added and that the alkaline agent sodium carbonate was replaced by ammonium sulfate.

4.4. Evaluation Method 4.4.1. Evaluation of Hue Angle of Printed Textile

For the ink jet ink compositions for textile printing of Examples 1 to 19 and Comparative Examples 1 to 6, the hue angles ∠h° of printed textiles were evaluated as described below.

A pretreatment composition prepared as described above was applied to a textile (100% cotton, viscose, silk, PA elastomer, or wool) with a degree of whiteness $L^*$ in the range of 85 to 95 and was dried by pressing the textile with a mangle at a pickup rate of 80%. A cartridge of an ink jet printer PX-G930 (manufactured by Seiko Epson Corporation) was filled with an ink jet ink composition for textile printing prepared as described above. The ink jet ink composition for textile printing was applied to a pretreated textile at a resolution of 1440 dpi×720 dpi to record (print) an image. The amount of ink landed was 23 mg/inch$^2$.

The textile on which the image was recorded was subjected to steaming at 102° C. for 10 minutes, was then washed with an aqueous solution containing 0.2% by mass of Laccol STA (manufactured by Meisei Chemical Works, Ltd., surfactant) at 90° C. for 10 minutes, and was dried to produce an evaluation sample. The hue angle ∠h° of the evaluation sample was determined according to JIS Z 8722: 2009 and was rated according to the following criteria. The degree of whiteness $L^*$ was measured with Spectrolino (a colorimeter manufactured by X-RITE, measurement conditions: light source D65, filter D65, φ2 degrees). Table 3 shows the evaluation results.

A: The hue angle ∠h° ranged from 280 to 300 degrees.

B: The hue angle ∠h° was 260 degrees or more and less than 280 degrees or more than 300 degrees and 310 degrees or less.

C: The hue angle ∠h° was less than 260 degrees or more than 310 degrees.

4.4.2. Evaluation of Light Fastness

The light fastness of the ink jet ink compositions for textile printing of Examples 1 to 19 and Comparative Examples 1 to 6 was evaluated as described below.

The evaluation samples prepared in "4.4.1. Evaluation of Hue Angle of Printed Textile" were subjected to ISO 105 B02 and were evaluated according to the following criteria. Table 3 shows the evaluation results. In this evaluation, although color fading is examined to determine fastness, and the hue angle is not directly measured, at least discoloration can be assessed.

A: Light fastness of grade 5 or higher

B: Light fastness of grade 4 or higher and lower than grade 5

C: Light fastness of grade 3 or higher and lower than 4

D: Light fastness of lower than grade 3

E: Ineligible because the printed textile had a hue angle ∠h° outside the range of 260 to 310 degrees.

4.4.3. Evaluation of Color Developability (Color Density)

Evaluation samples were prepared in the same manner as in "4.4.1. Evaluation of Hue Angle of Printed Textile" except that printing was performed at a resolution of 1440 dpi×720 dpi on a textile (in the case of reactive dye: 100% cotton, in the case of acidic dye: silk). Color developability was evaluated with a colorimeter (trade name Spectrolino, manufactured by X-RITE) with respect to the optical density (OD) (color density: the sum of the OD of a cyan component and the OD of a magenta component) of an image. The color developability of the image was rated on the basis of OD. The evaluation criteria are described below. Table 3 shows the evaluation results.

A: OD of 2.6 or more

B: OD of 2.4 or more and less than 2.6

C: OD of 2.2 or more and less than 2.4

D: OD of less than 2.2

4.4.4. Evaluation of Recoverability from Long-Term Clogging

A cartridge of an ink jet printer PX-G930 (manufactured by Seiko Epson Corporation) was filled with an ink jet ink composition for textile printing. After filling, a nozzle check pattern was printed to check for sufficient filling and no nozzle clogging, and then the head was returned to the home position (that is, the head nozzles were covered with a head cap) and was left to stand for one week in a 35° C./40% RH environment. After left to stand, the nozzle check pattern was printed to check for the ejection state of the nozzles, thereby evaluating the ink composition in terms of recoverability from long-term clogging of the ink jet head. The evaluation criteria are described below. Table 3 shows the evaluation results.

A: The ink composition was normally ejected from all the nozzles after one cleaning operation.

B: The ink composition was normally ejected from all the nozzles after two to five cleaning operations.

C: The ink composition was normally ejected from all the nozzles after six to ten cleaning operations.

D: The ink composition was normally ejected from all the nozzles after at least 11 cleaning operations, or there was a nozzle from which the ink composition was not normally ejected even after at least 11 cleaning operations.

4.4.5. Evaluation of Continuous Ejection Stability

A cartridge of an ink jet printer PX-G930 (manufactured by Seiko Epson Corporation) was filled with an ink jet ink composition for textile printing. Continuous solid printing was performed on 1000 A4 plain paper sheets. The average number of sheets continuously printable without cleaning operation was determined and evaluated by the following test method and according to the following criteria. Table 3 shows the evaluation results.

Test method (1): Printing is interrupted when printing failure (irregularity, missing, or bending of dots) occurs, and is recovered by cleaning operation. If recovery requires multiple cleaning operations, the multiple cleaning operations are counted as one failure.

Test method (2): If printing is interrupted by running out of ink in the ink cartridge, or if printing failure clearly results from running out of ink, the failure is not counted, and printing is restarted after the ink cartridge is immediately replaced.

Evaluation Criteria

A: The average number of continuously printed sheets was 80 or more.

B: The average number of continuously printed sheets was 40 or more and less than 80.

C: The average number of continuously printed sheets was 20 or more and less than 40.

D: The average number of continuously printed sheets was less than 20.

4.4.6. Foreign Matter Evaluation

A cartridge of an ink jet printer PX-G930 (manufactured by Seiko Epson Corporation) was filled with an ink composition and was left to stand at 40° C. for 3 months. The head was then removed from the printer, and the nozzle tip was visually inspected for the presence of foreign matter. Table 3 shows the results.

TABLE 3

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Evaluation results | pH of composition | 7.8 | 7.8 | 7.8 | 7.8 | 7.8 | 7 | 8.8 | 6.5 | 7.8 | 7.8 | 11 | 5.5 | 7.8 |
| | Hue angle of printed textile | A | A | A | A | A | A | A | A | A | A | A | A | A |
| | Light fastness: 100% cotton | A | A | A | A | A | A | A | A | A | A | A | A | A |
| | Light fastness: Viscose | A | A | A | A | A | A | A | A | A | A | A | A | A |
| | Light fastness: Silk | A | A | A | A | A | A | A | A | A | A | A | A | A |
| | Light fastness: PA elastomer | — | — | — | — | — | — | — | — | — | — | — | — | — |
| | Light fastness: Wool | — | — | — | — | — | — | — | — | — | — | — | — | — |
| | Color developability (OD) | A | A | A | A | A | A | A | A | B | A | B | B | A |
| | Recoverability from long-term clogging | A | A | A | A | A | A | A | A | A | B | A | A | B |
| | Continuous ejection stability | A | A | A | A | A | A | A | A | A | B | A | A | B |
| | Foreign matter | None | None | None | None | None | None | None | None | None | None | None | None | None |

| | | Example | | | | | | Comparative example | | | | | |
|---|---|---|---|---|---|---|---|---|---|---|---|---|---|
| | | 14 | 15 | 16 | 17 | 18 | 19 | 1 | 2 | 3 | 4 | 5 | 6 |
| Evaluation results | pH of composition | 7.8 | 7.8 | 7.8 | 8.3 | 8.3 | 8.3 | 7.8 | 7.8 | 7.8 | 7.8 | 8.3 | 7.8 |
| | Hue angle of printed textile | A | A | A | A | A | B | A | A | A | A | C | A |
| | Light fastness: 100% cotton | A | A | A | — | — | — | C | D | A | A | — | — |
| | Light fastness: Viscose | A | A | A | — | — | — | C | D | A | A | — | — |
| | Light fastness: Silk | A | A | A | A | A | A | C | D | A | A | E | D |
| | Light fastness: PA elastomer | — | — | — | A | A | B | — | — | — | — | E | D |
| | Light fastness: Wool | — | — | — | A | A | B | — | — | — | — | E | D |
| | Color developability (OD) | A | A | B | A | B | A | C | C | D | D | B | C |
| | Recoverability from long-term clogging | B | B | B | A | A | A | B | B | D | D | A | B |
| | Continuous ejection stability | B | B | B | A | A | A | B | B | D | D | A | B |
| | Foreign matter | None | None | Obsd. | None | None | None | None | None | Obsd. | Obsd. | None | None |

4.4.7. Evaluation of Ink Set

The light fastness of the ink sets of Examples 20 and 21 and Comparative Examples 7 and 8 in Table 2 was evaluated as described below. The light fastness of the ink sets was evaluated in the same manner as in the evaluation of the light fastness of the ink jet ink compositions for textile printing except that the ink sets were used to print an image while the amount of ink landed was controlled at a resolution of 1440 dpi×720 dpi such that the hue angle ∠h° of the printed image ranged from 260 to 310 degrees. Printing was performed on a 100% cotton textile and viscose, silk, PA elastomer, and wool textiles.

4.5. Evaluation Results

Table 3 shows the evaluation results of the ink jet ink compositions for textile printing. The results of the examples show that the use of a dye containing copper or chromium and having a hue angle ∠h° in the range of 260 to 310 degrees as defined by the CIELAB color space on a recording medium and 5% to 30% by mass of a cyclic amide that is liquid at normal temperature and that has a normal boiling point in the range of 190° C. to 260° C. can produce a color with a hue angle ∠h° in the range of 260 to 310 degrees with high color developability in printed textiles without color mixing of different colors, and can reduce the temporal hue change (higher light fastness).

This indicates that high color developability in printed textiles can be achieved by the ink jet ink composition including a dye containing copper or chromium and 5% to 30% by mass of a cyclic amide with a normal boiling point in the range of 190° C. to 260° C., the cyclic amide enabling a sufficient amount of the dye to be dissolved in the ink jet ink composition. The results of the examples proved that a color with a hue angle ∠h° in the range of 260 to 310 degrees can be produced without color mixing of different colors and that the temporal hue change can therefore be greatly reduced (light fastness).

In contrast, the results of the ink compositions of Comparative Examples 1 and 2 show that the use of a dye free of copper and chromium reduced light fastness. These comparative examples also had poor color developability. In Comparative Example 3, the small amount of cyclic amide (2-pyrrolidone) was insufficient for the dissolution of the dye C.I. Reactive Blue 13, thus resulting in poor color developability and the formation of foreign matter. This is probably because the dye aggregated and formed foreign matter. The foreign matter is probably aggregates of the dye. The present inventors assume that this phenomenon can be characteristic of C.I. Reactive Blue 13.

Comparative Example 4 shows that the addition of more than 30% by mass of 2-pyrrolidone reduced color developability. This probably results from increased penetrability of the ink to the textile. Comparative Example 4 also had very low recoverability from long-term clogging and ejection stability probably because impurities from a member of the ink passage were dissolved in the ink and were precipitated as foreign matter. Comparative Example 5 did not satisfy the hue angle. Comparative Example 6 had poor light fastness because the dye did not contain copper or chromium.

The results of Examples 11 and 12 show that a pH outside the range of 6 to 10 resulted in slightly poor color developability. This is probably due to decreased reactivity of the dye. Example 2 shows that if the hue of a textile printed only with C.I. Reactive Blue 13 requires fine tuning, the addition of approximately 1% by mass of other copper-containing dyes (C.I. Reactive Blue 15 and C.I. Reactive Blue 72) can maintain the light fastness level.

The results of Examples 13 and 14 show that the addition of an amount of alkyl polyol outside the range of 10% to 25% by mass tended to reduce recoverability from long-term clogging and/or continuous ejection stability. This is probably because the addition of less than 10% by mass of the alkyl polyol in Example 13 was insufficient for moisture retention and accelerated drying. The addition of more than 25% by mass of the alkyl polyol in Example 14 probably increased the viscosity during drying. Example 15 shows that the addition of an alkyl polyol with a high boiling point tended to reduce recoverability from long-term clogging and/or continuous ejection stability. This is also probably due to the increase in viscosity.

The results in Table 2 show that the ink sets of Examples 20 and 21 had better light fastness (a smaller temporal hue change) than Comparative Examples 7 and 8, which provided a composite ink containing multiple types of dyes or a navy blue hue by combining inks of different hues.

Among Examples 16 to 19 containing benzotriazole, only Example 16 formed foreign matter. The foreign matter is benzotriazole copper (complex) produced by a reaction between benzotriazole and free copper. It is conceivable that such foreign matter is particularly formed when C.I. Reactive Blue 13 is used as a dye.

The invention is not limited to these embodiments, and various modifications may be made therein. For example, the invention includes substantially the same constitutions as those described in the embodiments (for example, constitutions with the same functions, methods, and results, or constitutions with the same objects and advantages). The invention also includes constitutions in which unessential portions of the constitutions described in the embodiments are substituted. The invention also includes other constitutions that have the operational advantages of the constitutions described in the embodiments and other constitutions with which the same objects can be achieved. The invention also includes constitutions in which the constitutions described in the embodiments are combined with known techniques.

The entire disclosures of Japanese Patent Application Nos. 2016-255836, filed Dec. 28, 2016; 2017-147982, filed Jul. 31, 2017 and 2017-228000, filed Nov. 28, 2017 are expressly incorporated by reference herein.

What is claimed is:

1. An ink jet ink composition for textile printing comprising:
    a dye containing copper or chromium that is selected from the group consisting of CI Reactive Blue 15 and 72, CI Direct Blue 87, and CI Acid Blue 193; and
    5% to 30% by mass of a cyclic amide that is liquid at normal temperature and has a normal boiling point in the range of 190° C. to 260° C.,
    wherein a hue angle ∠h° defined by a CIELAB color space on a recording medium ranges from 260 to 310 degrees.

2. The ink jet ink composition for textile printing according to claim 1, wherein
    the dye has a maximum absorption wavelength in the range of 550 to 600 nm.

3. The ink jet ink composition for textile printing according to claim 1, wherein
    the dye is C.I. Acid Blue 193.

4. The ink jet ink composition for textile printing according to claim 1, wherein
    the dye content ranges from 3% to 15% by mass.

5. The ink jet ink composition for textile printing according to claim 1, wherein
    the ink jet ink composition for textile printing has a pH in the range of 6 to 10.

6. The ink jet ink composition for textile printing according to claim 1, wherein
    the ink jet ink composition for textile printing contains no benzotriazole.

7. The ink jet ink composition for textile printing according to claim 1, wherein
    the ink jet ink composition for textile printing contains an alkyl polyol with a normal boiling point in the range of 180° C. to 260° C., and
    the alkyl polyol content ranges from 10% to 25% by mass.

8. An ink set comprising the ink jet ink composition for textile printing according to claim 1.

9. An ink set comprising the ink jet ink composition for textile printing according to claim 2.

10. An ink set comprising the ink jet ink composition for textile printing according to claim 3.

11. An ink set comprising the ink jet ink composition for textile printing according to claim 4.

12. An ink set comprising the ink jet ink composition for textile printing according to claim 5.

13. An ink set comprising the ink jet ink composition for textile printing according to claim 6.

14. An ink set comprising the ink jet ink composition for textile printing according to claim 7.

15. A recording method comprising:
    a pretreatment process of applying a pretreatment composition containing at least one of an alkaline agent, an acid, and a hydrotropic agent to a textile; and
    a printing process of applying the ink jet ink composition for textile printing according to claim 1 to the textile.

16. A recording method comprising:
    a pretreatment process of applying a pretreatment composition containing at least one of an alkaline agent, an acid, and a hydrotropic agent to a textile; and
    a printing process of applying the ink jet ink composition for textile printing according to claim 2 to the textile.

17. A recording method comprising:
    a pretreatment process of applying a pretreatment composition containing at least one of an alkaline agent, an acid, and a hydrotropic agent to a textile; and
    a printing process of applying the ink jet ink composition for textile printing according to claim 3 to the textile.

18. A recording method comprising:
    a pretreatment process of applying a pretreatment composition containing at least one of an alkaline agent, an acid, and a hydrotropic agent to a textile; and
    a printing process of applying the ink jet ink composition for textile printing according to claim 4 to the textile.

19. A recording method comprising:
    a pretreatment process of applying a pretreatment composition containing at least one of an alkaline agent, an acid, and a hydrotropic agent to a textile; and
    a printing process of applying the ink jet ink composition for textile printing according to claim 5 to the textile.

20. A recording method comprising:
a pretreatment process of applying a pretreatment composition containing at least one of an alkaline agent, an acid, and a hydrotropic agent to a textile; and
a printing process of applying the ink jet ink composition for textile printing according to claim 6 to the textile.

\* \* \* \* \*